United States Patent [19]

Hsia et al.

[11] Patent Number: 4,518,618
[45] Date of Patent: May 21, 1985

[54] FOOD COATING COMPOSITIONS FOR FOODS COOKED BY MICROWAVE

[75] Inventors: Samson T. Hsia, Fremont; Pam Ogasawara, Oakland, both of Calif.

[73] Assignee: The Clorox Company, Oakland, Calif.

[21] Appl. No.: 348,248

[22] Filed: Feb. 12, 1982

[51] Int. Cl.³ .............................................. A23L 1/272
[52] U.S. Cl. .................................... 426/262; 426/296; 426/555; 426/652; 426/243
[58] Field of Search ...................... 426/74, 96, 97, 243, 426/262, 289, 296, 305, 310, 534, 555, 648–650, 652, 806

[56] References Cited

U.S. PATENT DOCUMENTS

| | | | |
|---|---|---|---|
| 2,485,659 | 10/1949 | Robertson | 426/244 |
| 2,865,764 | 12/1958 | Gorsica | 426/289 |
| 3,256,101 | 6/1966 | Arns | 426/243 |
| 3,479,188 | 11/1969 | Thelen | 426/19 |
| 3,662,673 | 5/1972 | Boyer et al. | 426/656 |
| 3,676,158 | 7/1972 | Fischer | 426/296 |
| 3,700,847 | 10/1972 | Rendek | 426/243 |
| 4,216,237 | 8/1980 | Smith | 426/74 |

OTHER PUBLICATIONS

Copson et al., Agricultural and Food Chemistry, vol. 3, No. 5, "Browning Methods in Microwave Cooking" 5/55, pp. 424–427.

*Primary Examiner*—Raymond Jones
*Assistant Examiner*—Elizabeth A. King
*Attorney, Agent, or Firm*—Stephen M. Westbrook; Joel J. Hayashida

[57] ABSTRACT

Food coating compositions having an ability to produce crisp, brown coatings on food products cooked in microwave ovens comprise coating ingredients and at least one additional salt ingredient. Especially increased crisping is achieved by adding a combination of three salts, i.e., potassium acetate, potassium chloride and potassium bicarbonate; or potassium acetate, potassium chloride, and sodium bicarbonate.

13 Claims, No Drawings

FOOD COATING COMPOSITIONS FOR FOODS COOKED BY MICROWAVE

DESCRIPTION

1. Field of the Invention

This invention relates to compositions utilized for coating foods in preparation for frying or cooking in order to produce a crunchy, browned appetizing product. More particularly, the invention compositions are especially useful for coating foods prior to cooking with microwave energy to produce a crisp, browned palatable cooked product.

2. Background of the Invention

In the age old cooking of foods by convection and conduction heating, the exterior of the food is initially heated to considerably higher temperatures than the interior portions. In fact, in order to cook the interior of relatively large food pieces, such as meats, the temperature of the exterior portions becomes considerably higher than the interior. The result of this cooking process is a crisping, dehydration, browning and carmelization of the exterior. Almost universally, this exterior crisping etc. is perceived as a desirable result of the cooking process, and, in fact, most cooks seek to achieve a crisp, brown, relatively crunchy surface on cooked meats, fish, dairy products, many starch dishes, and many vegetables. Frying in oils is also a common practice used to attain the desired browned crunchy exterior on the food product In the preparation of many baked and fried foods, it is common practice to dust or coat the uncooked food with coatings, usually comprised of flour, carbohydrates, sugars, spices, etc. These coatings, when the food is baked or fried, produce a brown, crunchy, relatively dry surface on the food that is perceived as a very desirable feature of foods prepared by these methods.

In recent years, with the advent of prepared and processed foods, a number of products have been developed and marketed for coating foods prior to baking or frying. Their purpose is to produce the desirable crisp, browned coating. Such products have found considerable market acceptance, especially for the preparation of baked foods which resemble fried foods in appearance and "mouth-feel", but avoid the use of oils and their attendant added calories indigestibility and fat content. Such products work quite well in the conventional convection-conduction oven environment. However, when used in the recently developed microwave cooking appliances, such coating products, either home-produced or purchased, leave much to be desired.

More specifically, in a microwave oven, high-frequency microwave energy is injected into a closed chamber in which the product to be cooked is placed. The microwave energy field couples with those food molecules which are capable of forming dipoles. In such a microwave environment the dipole food molecules become highly agitated and produce a "friction" which manifests itself in the release of heat energy within the food materials. Upon the release of heat, the food cooks much as in the conventional manner.

However, since the heat energy is released internally within the food, the surface (unlike conventional cooking methods) remains at a relatively even temperature with the interior; and consequently the high surface temperatures necessary to achieve browning, dehydration and crisping are never achieved. Therefore in those foods where the crisp, brown surface is desired, microwave ovens leave much to be desired.

In an effort to overcome these problems the appliance manufacturers have resorted to including radiant browning elements within the microwave chamber. Food coating merchandisers often include brown coloring components in the coating mixes, to artificially produce the desired browned appearance on the food surface.

While the auxiliary browning elements produce the desired crisping and browning, the added expense of the elements and increased complexity of the oven is self-evident. In the case of adding coloring components to food coatings, somewhat better color appearance is achieved; however, the desired surface crispness and dehydration is impossible to obtain by the mere addition of the coloring components.

It is desirable therefore, to provide an improved food coating mix which will produce a crisp, browned, dehydrated surface on food products cooked in a microwave appliance. In addition such improved food coating would have even more utility of it could be utilized as a general purpose coating for foods cooked in conventional ovens as well as in microwave ovens.

BRIEF DESCRIPTION OF THE INVENTION

Improved food coatings have now been formulated which can produce a crisp, brown, dehydrated surface coating on foods cooked in microwave ovens. Such formulations can also be used as a general all-purpose coating and will produce the desired surface color and texture on foods cooked by conventional as well as microwave means.

The inventive coatings incorporate into their ingredients food grade salts which have a particular affinity to microwave energy. Thus an increased amount of the microwave energy is coupled into the coating to produce a crisp, browned surface on the food to which the coating is applied. Such salt, or salts are added to the coating formulations in addition to the quantity of such salts which may occur normally in the food coating ingredients; and also in addition to the quantity of table salt, i.e., sodium chloride which is commonly added to commercial food coatings.

The salts produce the desired enhancement in crisping and browning when added to the coating mix in amounts hereinafter disclosed. The salts may be added singly, or in especially preferred combinations as hereinafter disclosed. In these special instances, the particular combinations of salts produce an unexpectedly pronounced crisping effect above and beyond that exhibited by the addition of the same salts individually or in alternate combinations. These especially preferred salt combinations will be more specifically described hereinafter.

In particular the salts are selected from potassium acetate, potassium chloride, potassium bicarbonate, potassium citrate, potassium dibasic phosphate, sodium acetate, sodium chloride, sodium bicarbonate, and sodium dibasic phosphate. The noted salts, when added on an individual basis to common food coating compositions and in amounts ranging in some 5–10% by weight, impart increased crisping to foods coated with said compositions and cooked in microwave ovens.

As will be hereinafter noted, the salts may be added individually, or in special preferred combinations of three salts to produce the desired effects. To achieve a synergistic effect, a combination of three of the above salts are added to the coating formulation. More specifically the especially preferred combinations include potassium acetate, potassium chloride, and potassium bicarbonate; or potassium acetate, potassium chloride, and sodium bicarbonate. By an as yet undetermined mechanism, the presence of the three salts, in the noted combinations, produces a heightened crisping and desirable texturing, as well as browning, on the food surface, when said combination of salts are incorporated into conventional food coating compositions.

Not only do the added salts produce the desired results in a microwave oven environment, they also do not affect the food coating's ability to produce a crisp, browned surface on foods cooked in conventional convection ovens, or in surface frying.

In the amounts added in the food coating compositions, the salts do not adversely affect the coating flavors or the flavors of the foods to which the coatings are applied.

In all other respects the improved food coatings include conventional ingredients, such as flour, starch, spices, herbs and other flavoring agents. The salts are incorporated into the conventional coating ingredients to produce the improve products that are especially advantageous for use on foods cooked in microwave ovens.

It should be understood that although the invention is concerned with the addition of the salts herein discussed to food coating compositions, common table salt, namely sodium chloride, also contributes to the crisping, browning process during microwave cooking. However, it is customary to include appreciable amounts, e.g., perhaps 5 to 10% of sodium chloride in food coating compositions. Thus, as will be noted hereinafter, it is clear that some quantity of sodium chloride may be present in the basic food coating compositions. Any sodium chloride present will, of course, contribute somewhat to the crisping, browning effect but such effect already occurs in conventional coating mixes. The present invention, however, resides in the recognition that it is the added quantities of salts which account for the increased crisping and browning of the food coating over conventional coating formulations, which may, or may not, include sodium chloride therein.

It is therefore an object of the invention to provide improved food coatings that produce a crisp, browned, flavorful coating on foods cooked in microwave ovens.

It is another object of the invention to provide improved food coatings formulations that are useful in all forms of cooking, including microwave ovens, conventional convection ovens, and stove top cooking.

It is still another object of the invention to provide food coating formulations that produce crisp, brown, flavorful coatings on cooked foods.

It is still another object of the invention to provide improved food coating formulations that include one or more from a particular group of salts therein.

It is yet another object of the invention to provide food coating formulations that include a combination of the salts, potassium acetate, potassium chloride, and potassium bicarbonate or sodium bicarbonate therein.

Other objects and advantages of the invention will be apparent from a review of the following detailed description and the claims appended hereto.

DETAILED DESCRIPTION OF THE INVENTION

Improved food coating compositions of the invention include conventional coating ingredients such as flour, starches, spices, herbs, and other flavoring agents; and added salts, specifically potassium acetate, potassium chloride, potassium bicarbonate, potassium citrate, potassium dibasic phosphate, sodium acetate, sodium dibasic phosphate, sodium chloride, and sodium bicarbonate. The added salts are normally present as individual additions or in some preferred compositions as a combination of three salts.

In the preferred embodiments, three salts, i.e., potassium acetate, potassium chloride, and either sodium or potassium bicarbonate are combined as the additives. The combination of these particular acetates, chloride, and bicarbonates provide a synergistic effect in producing the desired crisp, brown coating on foods prepared with microwave energy. Why these particular trio of salts produce a greatly heightened crisping effect is not known. But tests, hereinafter noted, yield crisping significantly greater than the crisping exhibited by the addition of single salts, or the salts in various other combinations.

The salts when added in the amounts discussed hereinafter, do not adversely affect the flavor of the food coating. In fact, the improved coatings compare favorably from a flavor standpoint with commercially available coating mixes presently in the marketplace.

In the coatings of the invention, the salts are added to conventional coating ingredients. Such conventional ingredients include, but are not limited to, flour, starches such as corn starch, corn meal, bread crumbs, bran flour or flakes, malted barley, sugar, malto dextrin, dehydrated soy sauce, monosodium glutamate, pepper, onion powder, paprika, celery, sage, thyme, sodium chloride, etc.

The added salts comprise, if the standard amount of NaCl (which is normally present in such mixes) is excluded from consideration, from a low in the neighborhood of about 5% to a high, if NaCl is included, of about 40% by weight of the coating formulations, although their percentages are not critical. In general, however, higher total salt concentrations may tend to overbalance the coating flavors towards excessive "saltiness" or "bitterness". Therefore a total salt concentration not exceeding about 40% by weight is generally preferred. At salt levels below about 5%, the advantages imparted by the salts' presence, i.e., the production of crisp, brown coatings during microwave cooking become less perceptible. Therefore, a total salt content (excluding the basic amount of roughly 10% sodium chloride which is otherwise present in the coating ingredients) of between about 5–30% in the aggregate by weight is preferred. When a single salt is added, i.e., potassium acetate, potassium chloride, potassium bicarbonate, potassium citrate, potassium dibasic phosphate, sodium acetate, sodium chloride, sodium bicarbonate or sodium dibasic phosphate, approximately 10% by weight seems to produce the maximum effect relative to standard coating mix (which usually contains 5–10% NaCl). Increased amounts of single salt additives appear to yield very little, if any, further improvement.

Certain combinations of the salts however give an unexpectedly heightened crisping effect even in total concentrations considerably higher (30%) than single salt additions. The preferred salt combinations as additives are: potassium acetate, potassium chloride and potassium bicarbonate; or potassium acetate, potassium chloride, and sodium bicarbonate. When the salts are added in the preferred combinations, relative ratios are maintained in the neighborhood of roughly 1:1:1. That is, the acetate, chloride, and bicarbonate are all maintained on a relatively equal basis. Nonetheless the relative ratios of the added salts may vary considerably from the aforementioned ratios, but should remain roughly in the indicated ratios. Most usually, the bicarbonate component is maintained at slightly lower levels than the acetate and chloride salts. The bicarbonate tends to impart a distinct flavor note in the formulations and it is therefore desirable to keep its percentage slightly lower than its companion salt additives.

In any event, it has been found that food coating mixes produce a crisper, browned coating on foods cooked with microwave energy if the preferred combinations of salts selected from the group, potassium acetate, potassium chloride, sodium bicarbonate, or potassium bicarbonate, are added to the coating formulations.

The salts either singly, or in the noted combinations, are included in the food coating formulations which, in addition, comprise conventional food coating ingredients. Commonly the principal ingredients include wheat flour, starches such as cornstarch, and carbohydrates such as sugar or malto-dextrins. To the major ingredients is added minor amounts of various herbs, spices, flavor enhancers, and flavoring agents.

For purposes of illustration, several variations of suitable food coating formulations according to the present invention are listed below. Such coatings are typical; however, obvious variations will be apparent to those skilled in the art; and the present application is not intended to be limited to the formulations set forth below.

EXAMPLE I

| Ingredient | % range by weight (approximate) |
|---|---|
| Flour | 28.8–31.4 |
| Corn starch, malto-dextrin, sugar | 32.2–35.0 |
| Spices and seasoning agents (e.g., monosodium glutamate, dehydrated soy sauce, paprika, pepper onion powder, celery powder, sage, garlic, thyme powder) | 4.8–5.2 |
| Potassium chloride | 7.6–11.4 |
| Potassium acetate | 7.6–11.2 |
| Sodium bicarbonate | 6.1–7.5 |
| Sodium chloride | 6.9–10.4 |

EXAMPLE II

| Ingredient | % range by weight (approximate) |
|---|---|
| Flour | 28.8–31.4 |
| Corn starch, malto-dextrin, sugar | 32.2–35.0 |
| Spices and seasoning agents (e.g., monosodium glutamate, dehydrated soy sauce, paprika, pepper onion powder, celery powder, sage, garlic, thyme powder) | 4.8–5.2 |
| Potassium chloride | 7.6–11.4 |
| Potassium acetate | 7.6–11.2 |
| Sodium bicarbonate | 6.1–7.5 |
| Sodium chloride | 6.9–10.4 |

EXAMPLE III

| Ingredient | % range by weight (approximate) |
|---|---|
| Flour | 36.0–39.4 |
| Starch, malto-dextrin, sugar | 34.1–37.4 |
| Spices and seasoning agents (e.g., monosodium glutamate, dehydrated soy sauce, paprika, pepper onion powder, celery powder, sage, garlic, thyme powder) | 5.3–5.8 |
| Sodium acetate | 4.8–13.0 |
| Sodium chloride | 7.0–12.7 |

In Example III above, any of the other salts noted herein can be substituted, on an individual basis, for the sodium acetate in the ranges stated, to produce the improved food coating compositions.

The most preferred salt content is the combination of potassium acetate, potassium chloride, and sodium bicarbonate, as set forth in the Example. The second most preferred combination is potassium acetate, potassium chloride and potassium bicarbonate.

The food coating compositions are simple mixtures of the noted flours, starches, carbohydrates, salts, spices and other seasoning agents. That is, the individual ingredients are secured in a powdered form and then thoroughly mixed together. Some of the ingredients may be more coarsely ground than others, however the fineness of division is not critical. The main criteria is that each ingredient must be relatively free flowing and sufficiently divided so as to permit thorough and intimate mixing into the final formulation. All of the ingredients are thoroughly mixed by conventional processing machinery to yield a powdered product. The product may then be packaged in suitable quantities and stored or shelved for future use.

In use, a suitable quantity of the powdered coating mix is placed in a container. The food product to be coated, e.g., chicken parts, meat pieces, if not already moist, is moistened with water and then placed into the container, and the entire contents are then shaken together to thoroughly coat the surfaces of the food product with the coating mixture.

The coated product is then placed in the cooking appliance, either a conventional oven, or microwave oven, and cooked as it would ordinarily be handled. No special cooking conditions are necessary. The coating formulations produce a crisp, golden brown surface on the cooked food product, even in microwave ovens.

The ability of various food coating formulations to produce the desired crisp surface on foods cooked in microwave ovens can be quantitatively evaluated in laboratory tests. Such testing is conducted utilizing a calibrated machine known as an "Instron" (available from Instron Corp., Canton, Massachusetts 02021) and an associated Kramer shear cell. The Instron machine and shear cell are utilized to "bite" the food under study and thereby provide readings which measure texture or crispness. The higher the reading (pounds/square inch) the greater the crispness. Such measurements are accepted as indicating the relative crispness properties of food products as such properties would be perceived by a consumer.

A number of such "crispness" tests were conducted on various food coating formulations in order to detect increased "crispness" produced by formulations made according to the present invention. These formulations were compared to samples which were coated with identical coating mixes free from the added salts. The results were statistically analysed to discover any significant increases in crisping. The tests were conducted with an Instron Model 1122 equipped with a Kramer Shear Cell using a crosshead speed of 1"/minute, a chart drive speed of 10"/minute and a full scale load of 200 pounds. The samples were chicken thighs coated with uniform quantities of various coating formulations and then subsequently cooked under uniform conditions for the same times in an Amana Radarange microwave oven, Model No. RR-7.

In one study the chicken parts were coated with a control coating mix comprising all purpose flour, cornstarch, dusting salt, monosodium glutamate, dehydrated soy sauce, paprika, maltodextrin, black pepper, onion powder, celery, sage and thyme; and then with the control coating mix to which a single salt was added. Table I below sets forth the results.

TABLE 1

| Sample | Additive level gms/100 gms | Average Slope (lbs/sq. in) |
|---|---|---|
| 1. Control | — | 457.66 |
| 2. Potassium acetate | 10 | 852.90 |
| 3. Potassium bicarbonate | 10 | 714.96 |
| 4. Potassium chloride | 10 | 723.08 |
| 5. Potassium citrate | 10 | 880.67 |
| 6. Potassium phosphate (dibasic) | 10 | 741.18 |
| 7. Sodium acetate | 10 | 940.46 |
| 8. Sodium bicarbonate | 10 | 715.83 |
| 9. Sodium chloride | 10 | 951.25 |
| 10. Sodium phosphate (dibasic) | 10 | 854.69 |

Statistical analysis indicated that all of the above salts when added as a single salt produced significant increase in crisping at the 95% confidence level over the control which contained no added salts but did contain about 10% sodium chloride as is common practice.

In a second study, combinations of the three preferred salts were added to the control coating mix. The results are shown in Table 2 below.

TABLE 2

| Sample | Additive level gms/100 gms | Average Slope (lbs/sq. in) |
|---|---|---|
| 1. Control | — | 569.21 |
| 2. Potassium acetate | 10 | 1118.02 |
| Potassium chloride | 10 | |
| Potassium bicarbonate | 10 | |
| 3. Potassium acetate | 10 | 1458.49 |
| Potassium chloride | 10 | |
| Sodium bicarbonate | 10 | |

In both instances, the preferred salt combinations produced truly significant increases in crisping effect at the 95% confidence level.

At the levels noted, all of the samples exhibited quite acceptable flavors, with no undue "saltiness" or "bitterness".

From the above Tables it will be appreciated that, from the standpoint of producing a crisp coating, the samples including the individual salts as noted, or a combination of three salts, i.e., potassium acetate, potassium chloride, and potassium or sodium bicarbonate yield a crisper coating than the controls. It should also be understood that the crispness tests do not consider the brownness of the cooked coating nor the flavor acceptability. However, quite fortuitously, the salt additives discussed hereinbefore, not only exhibit outstanding crisping characteristics, but also produce golden brown coatings and highly acceptable flavors when formulated as noted above.

We claim:

1. A method for crisping and browning the surfaces of foods comprising
coating said foods with a food coating formulation containing flour, cornstarch, corn meal, bread crumbs, bran flour or flakes, and a combination of three salts selected from the group consisting of potassium acetate, potassium chloride, potassium bicarbonate, potassium citrate, potassium dibasic phosphate, sodium acetate, sodium chloride, sodium bicarbonate, and sodium dibasic phosphate, wherein said three salts are added in substantially equal amounts and comprise at least 5% by weight of the food coating; and
cooking said foods with microwave energy for a time period sufficient to crisp and brown said surfaces of said foods.

2. A food coating composition for imparting a crisp and brown surface to foods, containing flour, cornstarch, corn meal, bread crumbs, bran flour or flakes, in combination with three salts selected from the group consisting of potassium acetate, potassium chloride, potassium citrate, potassium bicarbonate, potassium dibasic phosphate, sodium acetate, sodium chloride, sodium bicarbonate, and sodium dibasic phosphate in substantially equal amounts of at least 5% by weight of said food coating whereby upon applying said coating to the surface of a food and subjecting same to microwave energy, a crisp and brown surface is achieved.

3. A food coating composition for imparting a crisp and brown surface to foods cooked by microwave energy, comprising a combination of the salts potassium acetate, potassium chloride, and potassium bicarbonate, wherein each salt is present in the amount of at least 5% by weight of the food coating composition whereby upon applying said coating to the surface of a food and subjecting same to microwave energy, a crisp and brown surface is achieved.

4. The food coating compositions of claim 3 wherein the combination of salts may comprise in the aggregate up to about 30% by weight of the composition.

5. A food coating composition for imparting a crisp and brown surface to foods cooked by microwave energy comprising a combination of the salts potassium acetate, potassium chloride and sodium bicarbonate, wherein each salt is present in the amount of at least 5% by weight of the food coating composition whereby upon applying said coating to the surface of a food and subjecting same to microwave energy, a crisp and brown surface is achieved.

6. The compositions of claim 5 wherein the combination of salts may comprise in the aggregate up to about 30% by weight of the composition.

7. The food coating compositions of claims 3 or 5 wherein the combination of salts is present in amounts of at least 15% by weight in the aggregate.

8. A food coating formulation comprising flour, starches, carbohydrates, spices, herbs, and a combination of three salts selected from potassium acetate, potassium chloride, and potassium or sodium bicarbonate, wherein each salt is present in the amount of at least 5% by weight.

9. The food coating formulation of claim 8 wherein the three salts are potassium acetate, potassium chloride, and potassium bicarbonate.

10. The food coating formulation of claim 8 wherein the three salts are potassium acetate, potassium chloride and sodium bicarbonate.

11. The food coating formulation of claim 8 wherein the three salts are present in at least 15% by weight in the aggregate.

12. A food coating composition comprising about 57 to 63% by weight weight flour and starch, about 13 to 16% by weight spices, sodium chloride and seasonings, and about 7 to 11% by weight potassium chloride, about 7 to 11% by potassium acetate, and about 6 to 8% by sodium bicarbonate.

13. A food coating composition comprising about 64 to 59% flour and starch, about 11 to 13% spices, sodium chloride, and seasonings, and about 8 to 12% potassium chloride, about 8 to 12% potassium acetate, and about 6 to 8% sodium bicarbonate, all percentages by weight.

* * * * *